United States Patent [19]

Rager

[11] 4,090,609

[45] May 23, 1978

[54] HANDLE ASSEMBLY FOR DISK CARTRIDGES AND THE LIKE

[76] Inventor: Edgar A. Rager, 5746 Canna La., San Jose, Calif. 95124

[21] Appl. No.: 789,359

[22] Filed: Apr. 21, 1977

[51] Int. Cl.² .............................................. B65D 85/30
[52] U.S. Cl. ........................................ 206/444; 70/63
[58] Field of Search .............. 206/444, 405, 404, 303; 220/323, 318; 70/63

[56] References Cited

U.S. PATENT DOCUMENTS

| 1,137,078 | 4/1915 | Nicodemus et al. | 220/318 |
| 1,300,899 | 4/1919 | Wagner | 220/318 |
| 3,882,701 | 5/1975 | Wirth | 70/63 |

Primary Examiner—William T. Dixson, Jr.
Attorney, Agent, or Firm—Thomas Schneck, Jr.

[57] ABSTRACT

An improved handle assembly for selectively carrying or releasing the contents of a disk cartridge or the like. The handle is a U-shaped member with a housing pivotally mounted between the open ends of the U-shaped member and which may rotate therebetween. The housing contains movable dogs for latching the housing to the arms of the U-shaped handle so that an assembly which is connected to the housing will move when the handle is released if the housing is latched to the arms by movement of the dogs.

10 Claims, 12 Drawing Figures

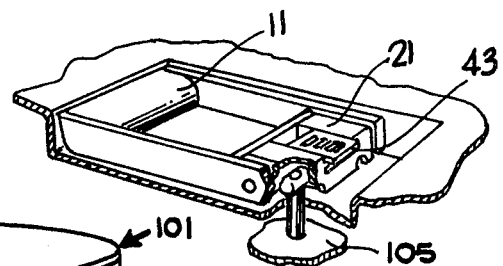
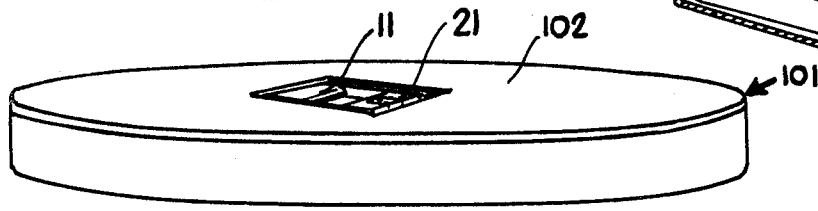
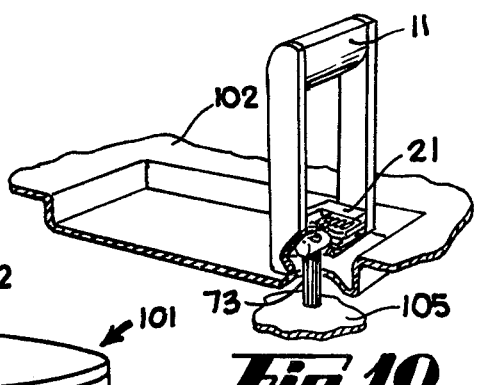
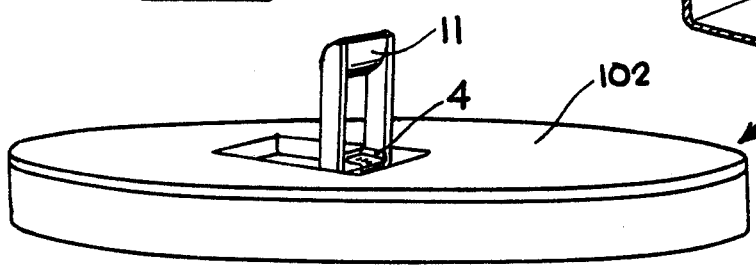
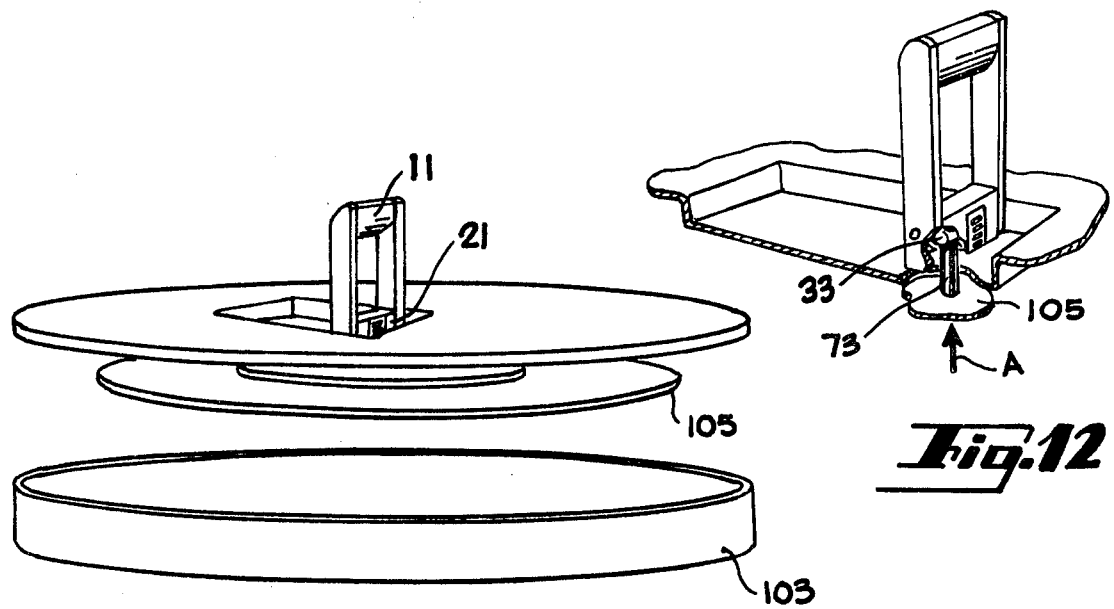

HANDLE ASSEMBLY FOR DISK CARTRIDGES AND THE LIKE

BACKGROUND OF THE INVENTION a. Field of the Invention

The invention relates to handles for containers and more particularly to a handle for a computer disk cartridge or the like.

Prior Art

Handles for disk cartridges are known. Handles of the prior art comprise a plastic U-shaped handle member having parallel arms with a joining bar at the base of the U-shaped member adapted to be held by a human hand, as well as a plate between the arms of the U-shaped member opposite the joining bar. Within the prior art plate is a pivotally mounted hinged metal assembly which is joined to articles mounted beneath a cover of a disk cartridge. The metal assembly may be locked in place by a transverse switch which is spring loaded and must be held in place in the locked position.

It is an object of the present invention to provide a simplified handle for disk cartridges and the like which eliminates some of the expensive metal construction of prior art handles, specifically in the plate between arms of the U-shaped members.

The above object is satisfied by providing a new handle assembly for disk cartridges wherein a new housing is provided between the open ends of a U-shaped handle member. The housing contains a pair of pivot members nested in pivot sockets, each with a stud adapted for connection to a lift-off assembly within a disk cartridge.

The housing also contains a slider block forming a portion of a latching means for locking the housing to the U-shaped handle member for releasing an assembly connected to the pivots from a container or other holder when the handle is latched to the housing. The slider block operates in combination with a pair of dogs in the housing having inward cam faces. The dogs are mounted to be transversely slideable when the slider block comes into contact with the cam faces of the dogs, urging them outward. The outwardly facing portions of the dogs have pins which pass through the housing into openings defined in the U-shaped arms of the handle. The dogs form a portion of the latching means for latching the housing to the U-shaped handle member. When the dogs are urged outwardly and the housing is latched to the handle, the handle, if raised by rotation of the joining bar about the housing, will release a connected assembly.

When the dogs are urged outwardly by the slider block, the slider block is said to be in a "release" position. When the slider block is moved away from the dogs and the dogs are forced inwardly by bias springs, the slider block is said to be in a "carry" position because rotation and lifting of the handle will require carrying of the container to which the handle is connected. The slider block provides two stable positions for a person to release or carry a disk cartridge assembly, or the like by means of leverage exerted or not exerted on the cartridge through pivot members of the housing, depending on the position of the slider block.

BRIEF DESCRIPTION OF THE DRAWINGS

FIG. 7 shows a handle of the present invention in combination with disk cartridge.

FIG. 8 is a cutaway detail of the apparatus of FIG. 7.

FIG. 9 is a second view of the apparatus of FIG. 7, showing the handle in a raised position, but the housing in a flat position for carrying the entire disk cartridge.

FIG. 10 is a detail showing the apparatus of FIG. 9.

FIG. 11 is a third view of the apparatus of FIG. 7 showing both the handle and the housing latched to the handle being released from the disk cartridge.

FIG. 12 shows a cutaway detail of the apparatus of FIG. 11.

DESCRIPTION OF THE PREFERRED EMBODIMENT

Figure 1:
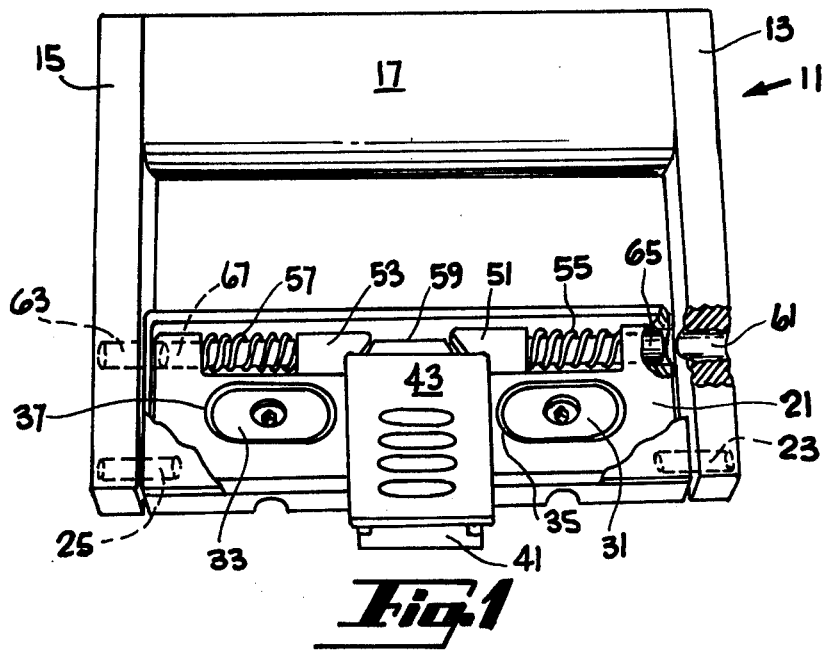
FIG. 1 is a top perspective view of the present invention showing the U-shaped handle member with a housing therebetween, with dogs in a retracted position.

With reference to FIG. 1, a U-shaped handle member is seen to have two parallel arms, 13 and 15 and a joining bar 17 therebetween which is adapted to be held by a human hand. Such a handle member has been previously known. However, in contrast to the prior art where a lift plate was secured between the arms of the handle, the present invention provides a housing 21 which is hinged to the handle member 11 by means of pins 23, 25. The housing 21 is disposed between arms of the U-shaped handle member, opposite the joining bar 17 which is to be held by human hands.

The housing 21 contains a pair of pivot members 31, 33 nested in pivot sockets 35, 37, respectively. The pivot members are preferably nylon or plastic cylinders or balls and should be mounted in respective sockets so that the pivot members may rotate. With reference to FIG. 1, it will be seen that the pivot members are capsule shaped cylinders having a circular cross section, although this exact shape is not critical. Such cylinders will rotate transverse to their axes and for purposes of this invention, that is all that is necessary. However, rotary motion in more than one direction could be provided.

A slider block 41 and its upper surface 43, form a slider means for urging the dogs 51, 53 outwardly, the combination forming a latching means in housing 21 for locking the plate to the U-shaped handle member 11. The dogs 51, 53 are seen to be spring-retained by springs 55, 57 which tend to push the dogs 51, 53 mutually together against slider block 41. Thus, when the slider block is pulled back into the position shown in FIG. 1, the dogs 51, 53 move inwardly as close as they can upon urging by the springs 55, 57. The dogs 51, 53 are slideably mounted in a channel 59 which extends along the side of housing 21 facing joining bar 17. The channel extends completely across the plate communicating with openings 61, 63 in the arms 13, 15 of the handle member 11. Each of the dogs 51, 53 has an outward end 65, 67 which is adapted to fit in a respective hole 61, 63 of handle 11.

Figure 2:
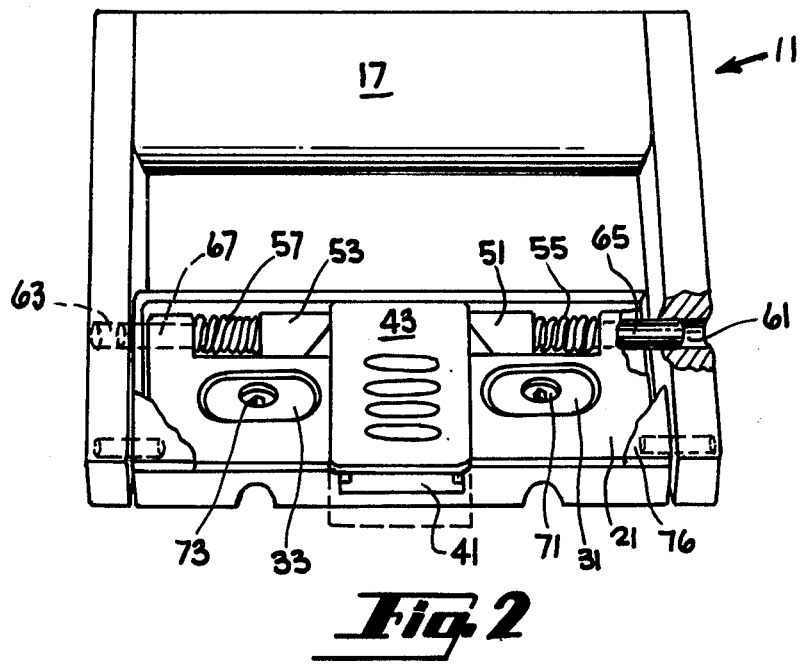
FIG. 2 is a top perspective view of the present invention with the U-shaped handle member and the housing therebetween with dogs extended into the handle, locking the plate thereto.

With reference to FIG. 2, the slider block 11 is seen to have been advanced, so that the slider block has pushed the dogs 51, 53 outwardly. The outward ends 65, 67 of the dogs 51, 53 are shown to have entered the holes 61, 63 within the arms of handle 11 thereby latching housing 21 to handle 11. In this position, the pivot members 31, 33 will serve to lift articles mounted beneath them, when the handle 11, with housing 21 latched thereto, is lifted. The pivot members will rotate slightly in their sockets and studs 71, 73 mounted within the pivot members connect the assembly to be lifted off the disk cartridge or other container, through the handle assembly.

Figure 3:
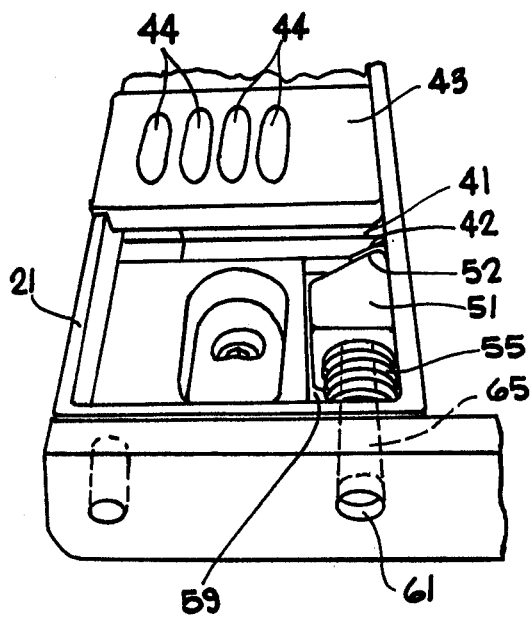
FIG. 3 is a detail of a portion of the plate, showing the slider block in a stable relation with respect to one of the dogs.

In FIG. 3, the slider block 41 is seen in the same position as in FIG. 2, fully advanced, forcing dog 51 outwardly so that the end 65 projects into hole 61. It will be noted that the slider block 41 is provided with a detent 42 at its forward edge for engaging the nose, 52, of dog 51. A similar detent is provided on the opposite side of the slider block not shown, for engaging the nose of the opposite dog. In FIG. 3, the slider means is seen to have an upper surface with depressions 44 which assist in pushing the upper surface with a single finger.

In FIG. 3, channel 59 may be seen providing some clearance for dog 51 so that the dog may move back and forth in the channel without an excessive amount of friction.

Figure 4:
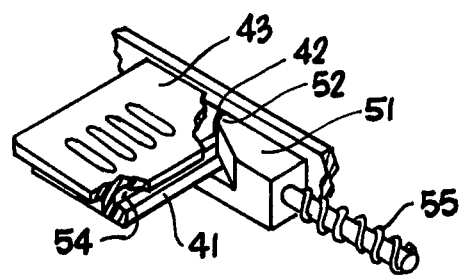
FIG. 4 is another detail of a portion of the plate showing one of the dogs in a stable relation with respect to the slider block.

In FIG. 4, dog 51 is seen again to have its nose 52 engaged with detent 42 of the slider block 41. The slider block contains a groove 54 below the upper surface 43 so that the plate 21 may have a cover, which is provided with a detent having edges which engage groove 54 and a groove on the opposite side of the slider means. The slider is adapted to slide between the pivot sockets of the plate with the upper surface 43 above the cover of plate 21 and the slider block 41 beneath the cover.

Figure 5:
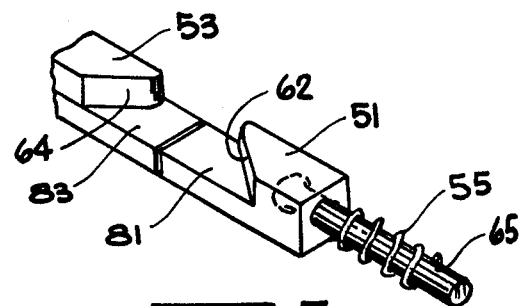
FIG. 5 shows a detail of the construction of the dogs of the apparatus of FIG. 1.

FIG. 5 shows that the dogs 51, 53 have cam faces 62, 64 which are at acute angles to the direction in which the dogs move. The dogs move in a direction parallel to the axis of each dog which is defined by the end 65 which will fit into a hole provided in a handle arm. It is seen that the end member 65 is a pin which is anchored in dog 51. A similar pin is anchored in dog 53 for forming end 67 of dog 53, as shown in FIG. 2. It will be seen that each of the dogs 51, 53 has a respective spacer arm 81, 83 which is adjacent to respective cam surface 62, 64. Each spacer arm of each dog faces an opposed spacer arm with both spacer arms abutting when retaining springs mounted on each pin force the dogs together. The spacer arms set a minimum at which the dogs may approach each other. It will be seen that the spacer arms and cam faces are at different elevations of the same dog. The channel in which the dogs move is deep enough in housing 21 so that the slider block passes over the spacer arms 81, 83 and merely contacts the cam faces 62, 64 when the slider block is urged forward. The spring 55 is axially mounted on pin 65 and provides an inward bias to the cam faces which must be overcome by action of the slider block pushing the dogs outwardly. A plastic cover 76 fits over housing 21.

Figure 6:
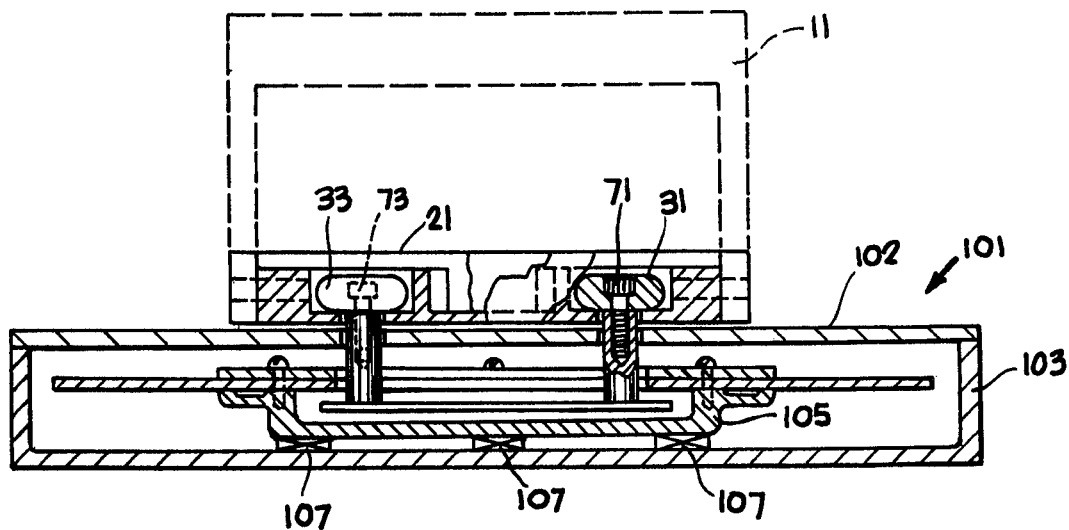
FIG. 6 is a side cutaway view of the handle assembly of the present invention attached to a disk cartridge for use therewith.

FIG. 6 shows how the handle assembly of the present invention is used in conjunction with a disk cartridge 101 or similar container. The disk cartridge has a cover or lid 102 removable from an outer shell or rim 103. The cartridge has an internal member such as the ferromagnetic disk hub 105. A recording medium is usually mounted on the hub 105, such as disk 104. Rim 103 contains magnets 107 which lock the hub 105 to the rim 103 for securely seating it therein. When the hub 105 is removed from the rim 103 it is sometimes locked onto a computer by similar magnets. Housing 21 is shown to be in flat position parallel to cover or lid 102. This means that the slider button is in the position illustrated in FIG. 1. In this position the handle 11 may be freely raised and the pivot members 31, 33, having studs 71, 73 mounted therein will pick up the entire assembly without lifting off the hub from rim 103. Studs 71, 73 may be common machine screws. However, if housing 21 were latched to handle 11, the elevation of pivot members 31, 33 would raise as the handle and plate were lifted. As the handle raised, hub 105 would be lifted off magnets 107, there by separating lid 102 from rim 103.

The use of the apparatus is illustrated with respect to FIGS. 7-12. In FIG. 7, it is seen that the handle member 11, as well as housing 21 are in a flat position parallel to lid 102.

In the detailed view of FIG. 8, it is seen that the slider upper surface 43 is in a rearward position so that the dogs are drawn inwardly at their minimum distance and the housing 21 is not latched to handle 11.

Thus, in FIG. 9, when handle member 11 is raised, housing 21 remains flat. In this position, the complete disk cartridge or similar article may be carried.

In FIG. 10 the handle 11 is seen to be raised and if the cover 102 is lifted with the handle, the entire disk cartridge can be raised and carried because housing 21 remains flat.

In FIG. 11, the housing 21 has been latched to handle 11. This causes the pivot members to be raised, releasing hub 105 from the magnets holding it down, either in the disk cartridge as shown, or from a computer spindle, not shown.

In FIG. 12 the change in elevation of pivot member 73 is indicated by the arrow A which also indicates the release of the hub 105 from the magnets holding it down. The increase in elevation of the pivot members 73 is transmitted to hub 105 by the connecting screw or stud 73.

It can be readily seen from FIGS. 1-12 that the release of the hub 105 from rims 103 may be achieved by one hand which first moves the slider to an appropriate position and then lifts the handle member. In addition to simplicity of use, the entire plate provided between arms of the U-shaped handle member may be made of plastic, such as Delrin, which is a preferred material except for pins mounted within the dogs and studs placed in each pivot member connecting the hub to the pivot. Such studs may be common machine screws. The block may be injection molded and the dogs, pivot members and slider means may be similarly molded. The cost of the present apparatus, when mass produced, is substantially less than the prior art handle assembly which required a plurality of metal parts which had a complicated interaction.

The use of the present invention with disk cartridges is only exemplary. The apparatus may be used as a handle assembly for other releaseable members within containers which require a latching for picking up interior members in a selectable manner with respect to the container.

What is claimed is:

1. In a handle of the type used in a cover of disk cartridges or similar containers, wherein the handle is adapted to be held by a human hand and is rotatably connected to said cover the improvement comprising, a housing member rotatably hinged between opposed handle arms, said rotatable housing member having means for selectively latching said housing member to an arm of a container handle, said rotatable housing member disposed adjacent to a cover of said container, and at least one pivot member nested in a pivot socket defined within a plate of said housing, said pivot member adapted for connection through said housing to a liftable member beneath the cover of said container.

2. A handle assembly for disk cartridges and similar containers comprising, a container having a cover, a U-shaped handle member rotatably connected to said container cover and having two arms, a joining bar at the base of the U-shaped member, adapted to be held by a human hand, and a housing member rotatable with respect to said handle member and having opposed edge regions and a central region, said arms spaced adjacent to opposed edge regions of said housing member at ends of said arms opposite said joining bar and hinged thereto, at least one pivot member nested in a pivot socket defined within a plate of said housing, said pivot member adapted for connection through said housing to a member releaseable from said container, and latching means in said rotatable housing member for selectably latching said housing member to said arms of said U-shaped member for releasing and carrying liftable members from said container.

3. The apparatus of claim 2 wherein said latching means comprises a pair of spaced apart, spring biased, mutually facing dogs, each dog slideably mounted within said housing in a channel, which channel extends to an opening defined in an arm of the U-shaped member for receiving said dog when said dog is urged against said bias springs, and slider means for urging said dogs against said retaining springs driving said dogs into openings defined in said arms, thereby latching said housing to said arms.

4. The apparatus of claim 3 wherein each of said dogs has an inward cam surface proximate said slider means for contact therewith and mounted in a position where said slider means may slide into said cam surface for urging said dogs outwardly against said retaining springs.

5. The apparatus of claim 4 wherein said slider means includes a detent to be held by said dogs thereby providing a fixed position for each slider when said housing is latched to said U-shaped member by said dogs.

6. The apparatus of claim 5 wherein said slider means has an upper surface adapted to be pushed by a human finger and a lower slider block beneath said upper surface adapted to slide between pivot sockets of said housing in a trough defined within said housing transverse to said channel.

7. The apparatus of claim 6 wherein said housing has a cover mounted over said dogs, pivot members and lower slider block, said cover defining a notch for movement of said slider block toward and away from said dogs.

8. The apparatus of claim 4 wherein each of said dogs has a spacer arm mounted adjacent each cam surface and facing an opposed dog whereby said opposed dogs are spaced at a minimum distance by said spacer arms and a maximum distance by said slider block.

9. The apparatus of claim 2 further defined by machine screws having heads recessed within said pivot members and having shanks extending below said plate for connection to a releaseable member.

10. The apparatus of claim 9 wherein said U-shaped member is hinge mounted near said housing in a cover of a container having a member therein to be released from said container, and said machine screws are connected to said member whereby said member is released when said housing is latched to said U-shaped member and said U-shaped member is rotated and lifted.

* * * * *